United States Patent

Newbould

[15] 3,654,682
[45] Apr. 11, 1972

[54] TOOL HOLDER

[72] Inventor: Edward H. Newbould, 191 Silver Spur Drive, York, Pa. 17402

[22] Filed: Sept. 1, 1970

[21] Appl. No.: 68,609

[52] U.S. Cl. ................................................29/96
[51] Int. Cl. ..............................................B26d 1/00
[58] Field of Search ..........................29/96, 97, 98

[56] References Cited

UNITED STATES PATENTS

| | | | |
|---|---|---|---|
| 1,838,520 | 12/1931 | Archer | 29/98 |
| 3,173,191 | 3/1965 | Alexander et al. | 29/96 |
| 3,341,919 | 9/1967 | Lovendahl | 29/96 |
| 3,341,920 | 9/1967 | Kelm | 29/96 |
| 3,341,921 | 9/1967 | Weller et al. | 29/96 |
| 3,341,923 | 9/1967 | Kelm | 29/96 |
| 3,488,822 | 1/1970 | Jones | 29/96 |

*Primary Examiner*—Harrison L. Hinson
*Attorney*—C. Hercus Just

[57] ABSTRACT

A tool holder having a shank provided with a recess to support an anvil and an expendable cutter insert which is held against one or more walls of the recess by a clamping screw provided with a lever action effected by the screw as it is threaded into a socket in the shank of the tool.

5 Claims, 6 Drawing Figures

PATENTED APR 11 1972                    3,654,682

*INVENTOR.*
EDWARD H. NEWBOULD
BY
*ATTORNEY*

TOOL HOLDER

BACKGROUND OF THE INVENTION

A substantial number of tool holders presently are available in which expendable cutter inserts are clamped in various ways with respect to seats or recesses in the shank of the tool. Many of these involve clamping shoes which must be completely removed before the expendable cutter can be released for replacement or adjustment. This is time consuming. As a result, in more recent years, designs of tool holders have been developed in which the cutter inserts are provided with a central hole and the clamping bolt has a head which is received in said hole but does not overlie any portion of the rim of the cutter surrounding the hole, known in the trade as the "pin lock" design, whereby when the clamping screw is released from the cutter by means of limited rotation, the cutter insert may be readily removed from the upper end of the clamping screw and either adjusted to present a new cutting edge or a new insert may be mounted upon the holder and screw and tightened into operative position by rotation of the screw.

In most designs of the latter type in which no portion of the screw head overlies the upper surface of the cutter insert, the various means which are utilized to effect a wedging or clamping action of one or more side surfaces of the cutter insert against complementary walls in the recess of the shank either have too limited an extent of thread area to sustain extended periods of clamping action satisfactorily or the clamping leverage is of an awkward type which places an undue strain upon the locking screw and thereby tends to either bend the screw after limited use or be ineffective to provide adequate clamping action over substantial periods of time. Representative patents disclosing certain structures presently used are as follows:

U.S. Pat. No. 3,320,654, to Lovendahl, dated May 23, 1967, discloses a clamping bolt having a cam type head which engages a collar fitted into the central aperture of the cutter insert. The arrangement is such that a weak neck is formed on the camming head of the bolt.

U.S. Pat. No. 3,341,920 to Kelm, dated Sept. 19, 1967, provides a clamping bolt having a conical intermediate camming portion but it has a very small diameter of a threaded lower end which engages mating threads in the tool shank very loosely to permit angular positioning of the clamping bolt. Thus, only minimum type threaded clamping force is present. Further, the leverage provided by the bolt is known as the second class type, wherein the fulcrum is supplied by the threads at the lower end, the working force is applied intermediately of the ends by the conical cam, and the clamping force produced thereby is at the upper end. This type of leverage is acknowledged generally to be less efficient than a lever of the first class due to the difference in lever arms and the additional torque required to produce work equivalent to that of a lever of the first class.

SUMMARY OF THE INVENTION

It is the principal purpose of the present invention to provide a tool holder in which a tool shank is provided with a recess at one end which is defined by one or more walls and a base surface against which an anvil is disposed and an expandable cutter insert is mounted upon the anvil, the anvil and cutter insert having central apertures axially aligned with a bore extending from the base surface of the shank through the bottom surface thereof, and a clamping screw is provided with a head on one end disposed within the aperture of the cutter insert and the opposite end is tapered for engagement with a stationary taper or wedge surface in the lower portion of the bore in the shank. The intermediate portions of the clamping screw as well as the bore in the shank are taper-threaded in complementary manner to provide a wedging action of the tapered end of the clamping screw in a direction to move the headed end of the screw in a direction to firmly press one or more surfaces of the cutter insert against complementary walls in the recess of the shank by a fulcruming action in which the clamping screw acts as a lever of the first class and thereby provides very substantial force to effect the desired clamping of the cutter insert.

Another object of the invention is to dispose the bore in the shank at a very slight angle to a line normal or perpendicular to the plane of the base surface of the recess in the shank, thereby to facilitate the clamping action effected by the screw to wedge or force the side surfaces of the cutter insert against the adjacent walls of the recess in the shank.

It is a further object of the invention to provide the complementary threads within the bore of the shank and upon the clamping screw in such manner and to so dimension the threads that when the cutter insert is firmly clamped against one or more side walls of the recess in the shank the threads will be in firm abutting relationship along one side of the clamping screw but will be slightly spaced along the opposite side, thereby providing means to effect the aforementioned fulcruming action in which the clamping screw serves as a lever of the first class and is fulcrumed intermediately of its ends.

Details of the invention and the foregoing objects, as well as other objects thereof, are set forth in the following specification and illustrated in the accompanying drawing, comprising a part thereof.

DESCRIPTION OF THE PREFERRED EMBODIMENTS

Figure 1:
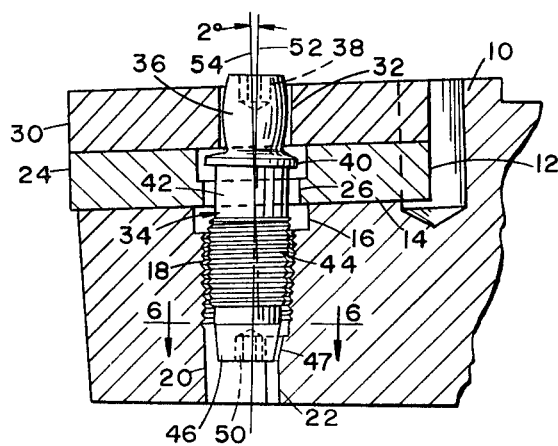
FIG. 1 is a fragmentary, vertical sectional view of an exemplary end of a shank of a tool holder in which an anvil and expendable cutter insert are mounted within a recess and clamped therein by a lock screw in accordance with the principles of the present invention, said view illustrating the screw in preliminary, non-clamping position and said view being taken on the line 1—1 of FIG. 2.
Figure 2:
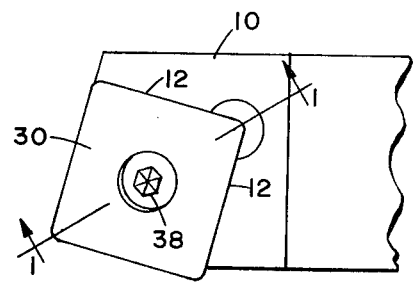
FIG. 2 is a fragmentary top plan view of the tool supporting end of a tool shank, shown on a smaller scale than employed in FIG. 1 and illustrating the principles of the invention.
Figure 3:
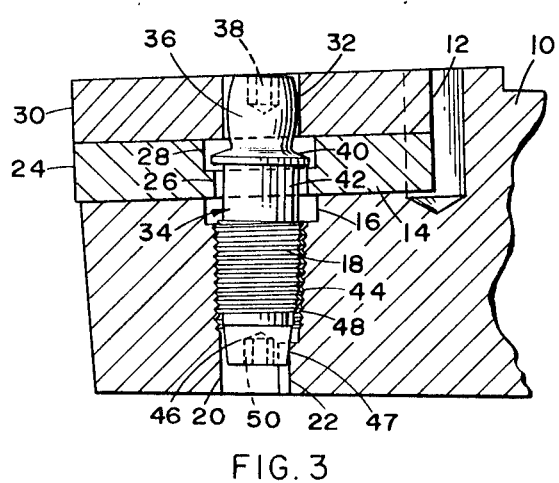
FIG. 3 is a view similar to FIG. 1 but showing the lock screw in cutter-clamping position.
Figure 4:
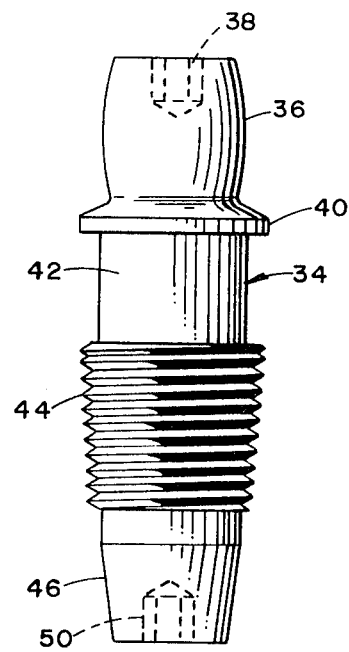
FIG. 4 is a side elevation of the lock screw per se such as shown in FIGS. 1 and 3 but illustrated on a larger scale than in said figures.
Figure 6:
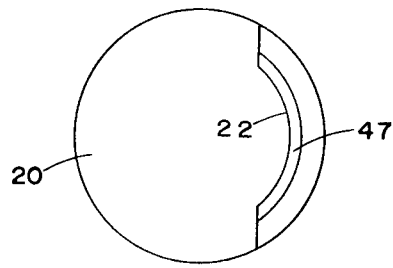
FIG. 6 is a top plan view of the lower portion of the bore in the shank of the tool holder as seen substantially on the line 6—6 of FIG. 1.

Referring to FIGS. 1 and 3, the fragmentary outer end 10 of the shank of a tool holder is illustrated in vertical section which is taken substantially on the line 1—1 of FIG. 2. The end 10 of the shank is provided with a recess defined by a pair of angularly related side walls 12 which are substantially perpendicular to a base surface 14. Base surface 14 is provided substantially centrally thereof with a compound type of bore which includes an upper clearance portion 16, an intermediate taper threaded portion 18, and a lower, three-quarter cylindrical portion 20 which, as shown in FIGS. 1 and 3, but is best illustrated in FIG. 6, has a tapered segment 47 formed on the upper, inner edge of a curved projection 22 for purposes to be described. All diameters, including the inner surfaces of projection 22 and tapered segment 47, are about the center line of the bore in the shank.

The aforementioned recess receives a metal anvil 24 which firmly abuts the base surface 14 of the recess. The anvil has a central aperture 26 which, at its upper end, is provided with an enlargement 28 for purposes to be described. An expendable cutter insert 30, which also has a central aperture 32, rests firmly upon the upper surface of anvil 24 and the purpose of the invention is to wedgingly clamp one or more side surfaces of the cutter insert against the side walls 12 of the recess in the shank 10. This is accomplished by means described hereinafter. The cutter insert preferably is of a very hard cutting material such as a suitable metallic carbide, high speed steel, or the like.

Firm clamping of the cutter insert in operative position is effected by a lock screw 34 which is so designed as to be rugged and highly effective to clamp the cutter insert 30 in operative position in a manner superior to any prior devices. In this regard, the lock or clamp screw 34 may be considered to be the most important single element of the invention but in order to achieve the desired result, it depends upon cooperation with other elements, as described hereinafter. The lock screw 34 is provided with a clamping end or head 36 which is at least partially spherical or spheroidal, due to the fact that in effecting the clamping action referred to, it is preferred that a portion of the side walls of the head 36 will have a rolling or sliding action relative to one side of the aperture 32 of the cutter insert 30. Said clamping end is provided with an inwardly extending recess 38 which, in plan view, has a geometrical configuration complementary to that of a wrench to effect rotation of the screw in both clamping and releasing directions.

The inner end of the head 36 of screw 34 terminates in a circular flange 40 which does not engage but overlies the annular shoulder of the enlargement 28 of aperture 26 of anvil 24 in spaced relationship, as is seen in FIGS. 1 and 3. This prevents the unintentional removal of the anvil 24 or the accidental loss or dropping thereof incident to changing or adjusting the cutter insert 30 when lock screw 34 is loosened for that purpose. Adjacent the circular flange 40 is an intermediate cylindrical portion 42 which extends through the central aperture 26 of anvil 24 and also is disposed at least partially within clearance portion 16 of the bore in the shank 10.

Disposed between the cylindrical portion 42 and the opposite end of the lock screw 34 is an intermediate tapered portion 44 which is threaded. The taper is complementary to the intermediate tapered threaded portion 18 of the bore in the shank 10 and said threads preferably resemble pipe threads, for example, which, customarily, are relatively coarse and are formed on tapered portions of pipes and rods according to standard formulation.

The purpose of tapering the threaded portion 44 on lock screw 34 and the portion 18 in the bore of shank 10 is to facilitate ready initial coengagement of the threaded members, followed by ultimate relatively tight engagement. As the screw 34 is loosened or unlocked, the clearance between the threads becomes greater more quickly if such taper were not employed. This allows the cutter insert to be indexed or removed more easily than otherwise with minimum rotation of screw 34.

Another purpose of the tapered threads is to provide a far greater coengaging threaded area between the lock screw and the threaded bore it engages than has been utilized heretofore in previous tool holders of the so-called pin lock design, in which no portion of the lock screw overlies the upper surface of the expendable tool insert, thereby overcoming one of the weaknesses and disadvantages of prior constructions.

A further purpose of providing such tapered, relatively coarse threads in the instant construction of the invention is to permit limited fulcruming action of the first class in which the fulcrum is intermediate between the locations where force is applied and resulting force is delivered. This is illustrated diagrammatically in FIG. 5 and involves another characteristic of the lock screw 34 which comprises a tapered end 46 which is opposite the clamping head 36. The tapered surface is complementary to the curved tapered surface 47 on the curved projection 22 which is fixedly positioned in the lower portion of the three-quarter bore 20 provided in shank 10.

Figure 5:
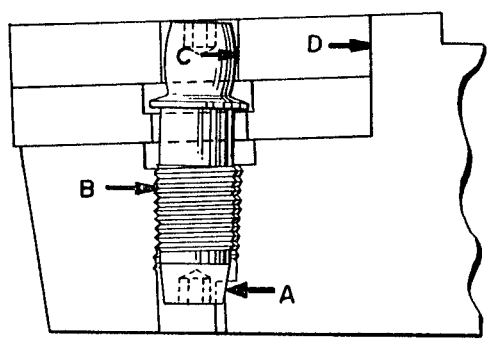
FIG. 5 is a diagrammatic view similar to FIGS. 1 and 3 to illustrate principles of the fulcruming action comprising a feature of the invention.

Referring to FIG. 5, it will be seen that when the lock screw 34 is threaded in clamping direction, the tapered end 46 of the screw will engage the curved tapered surface 47 of projection 22 and apply force A against the lower end of screw 34. Fulcrum B will engage the screw intermediately of the ends thereof in order that force A will result in force C being applied against the central aperture 32 of cutter insert 30 which forces it at B against wall 12 of the recess in the shank 10. As a result, there will be a slight space 48, which is shown at the right-hand side in FIGS. 3 and 5, between the threads of threaded portion 44 of lock screw 34 and the threads of tapered portion 18 within the bore of the shank 10. In contrast to this, it will be seen in FIG. 1, wherein the lock screw 34 is only initially threaded into the bore in the shank, that there are spaces substantially around the entire circumference of the threaded portions of screw 34 and the tapered portion 18 of the bore in the shank. The dimensions employed in forming the threads 44 upon the screw 34 and in the tapered portion 18 of the bore of the shank enables such spacing 48 to be effected as shown in FIGS. 3 and 5.

Another advantage of the design of lock screw 34, and particularly with respect to providing substantial diametrical dimensions to the tapered threaded portion 44 of the screw, is that it is in this area where there normally will be a tendency to bend the screw incident to effecting the clamping operations referred to above. Accordingly, the massiveness of said tapered threaded portion 44 is fully capable of withstanding such bending tendencies without deformation of the screw in any way. Also, to facilitate operation of the screw 34, if desired, the tapered end 46 thereof may be provided with another recess 50 of geometrical configuration for the reception of a wrench of complementary configuration. If desired, recess 50 may be the same size as recess 38.

Another feature of the invention which contributes to the effectiveness of the clamping of the screw insert 30 by screw 34 is illustrated in FIG. 1, wherein it will be seen that the axis 52 of the bore is at a slight angle to a line 54 which is perpendicular or normal to the base surface 14. Further, referring to FIG. 2, wherein the cutter arrangement is shown to be square and two side surfaces thereof respectively abut the angularly related side walls 12 of the recess in the shank, the angle between the axis 52 of the bore and the line 54 preferably is within the plane defined by the section line 1—1 in FIG. 2. By such arrangement, said angle facilitates the clamping of the cutter insert 30 in a direction parallel to said section line which actually bisects the angle between the side walls 12. By way of illustration in FIG. 1, said angle is indicated as being approximately 2°. This angle may be varied slightly but under no circumstances should the same be in excess of about 4°.

From the foregoing, it will be seen that the present invention employs a fulcruming action to achieve the desired clamping of a cutter insert against side walls of a recess in the tool shank by means of a clamping or lock screw of the type having a head which fits within a central aperture in the cutter insert without overlying the upper surface of the cutter insert, thereby facilitating removal of the insert from the tool shank and repositioning the same thereon, followed by the limited threading rotation of the lock screw to effect final clamping by means of the fulcruming functions described above.

The structure is relatively simple and capable of mass production to minimize cost. In addition to the advantages described above, it also is to be seen that the arrangement compensates for limited dimensional inaccuracy which frequently occurs to varying degrees in the cutter inserts as well as in certain areas of the tool holder. There also are a minimum number of working parts and there are no elements which are accidentally separable to account for when indexing or changing cutter inserts, except the cutter insert per se. The lock screw may be operated from either end and the critical parts of the device such as the cooperating threaded portions and the coengageable tapered portions at the lower end of the screw 34 are all protected during normal use.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A tool holder comprising in combination, a shank for support by a tool holder and having a recess in the forward upper end thereof and a bore extending downward from the base surface of said recess and through the bottom surface of said shank, the intermediate portion of said bore being tapered downwardly and inwardly and threaded, a centrally apertured anvil on said base surface of said recess, a centrally apertured cutter insert on said anvil and adapted to have one side surface firmly clamped against a wall of said recess, a lock screw having a clamping end of slightly smaller diameter than said aperture in said cutter insert and positioned therein, the intermediate portion of said screw being tapered and threaded complementarily to said bore and the other end of said screw having a downwardly and inwardly extending taper, and a curved taper complementary to that on said other end of said screw positioned at one side of the lower end of said bore and engageable with the same when said screw is threaded into said bore and thereby being operable to fulcrum said screw relative to the axis of said bore and move the clamping end of said screw in a direction to firmly abut said cutter insert against said wall of said recess in said shank and thereby clamp said insert in operative position upon said shank.

2. The tool holder according to claim 1 in which the axis of said bore in said shank is at a small angle to a line normal to said base surface of said recess.

3. The tool holder according to claim 2 in which said axis of said bore slants from said normal line toward said wall of said recess.

4. The tool holder according to claim 2 in which said recess in said shank has a pair of walls perpendicular to said base surface of said recess and at an angle to each other in complementary arrangement to a pair of adjacent side surfaces of said cutter insert, and said angle between said bore and normal line being within a plane bisecting the angle between a pair of walls of said recess.

5. The tool holder according claim 1 to which said tapered threads on said screw and within said bore are of such diametrical dimensions that when the tapered end of said screw abuts said curved taper in said bore and clamps said insert against said wall of said recess the complementary tapered threads of said screw and in said bore abut along one side and are slightly spaced along the opposite side to provide a lever type fulcrum action of the first class.

* * * * *